United States Patent
Leroy et al.

(10) Patent No.: US 8,100,466 B2
(45) Date of Patent: Jan. 24, 2012

(54) VEHICLE ROOF HAVING A MODULAR, MULTISHELL STRUCTURE

(75) Inventors: Alain Leroy, Diessen-Deftenschwang (FR); Heinz Pschorn, Dachau (DE)

(73) Assignee: Webasto AG, Stockdorf (DE)

( * ) Notice: Subject to any disclaimer, the term of this patent is extended or adjusted under 35 U.S.C. 154(b) by 611 days.

(21) Appl. No.: 11/577,753

(22) PCT Filed: Oct. 20, 2005

(86) PCT No.: PCT/DE2005/001876
§ 371 (c)(1),
(2), (4) Date: Jul. 7, 2009

(87) PCT Pub. No.: WO2006/042529
PCT Pub. Date: Apr. 27, 2006

(65) Prior Publication Data
US 2009/0267387 A1 Oct. 29, 2009

(30) Foreign Application Priority Data
Oct. 21, 2004 (DE) .......................... 10 2004 051 380

(51) Int. Cl.
*B62D 25/06* (2006.01)
(52) U.S. Cl. ....................................... 296/214; 296/210
(58) Field of Classification Search .................. 296/39.1, 296/208, 210, 214; 307/9.1, 10.1; 439/34
See application file for complete search history.

(56) References Cited

U.S. PATENT DOCUMENTS

| 4,653,802 | A | 3/1987 | Watanabe et al. |
| 5,825,096 | A | 10/1998 | Morimoto et al. |
| 6,318,797 | B1 | 11/2001 | Böhm et al. |
| 6,582,013 | B1 * | 6/2003 | Inoue et al. .................... 296/214 |
| 7,100,974 | B2 | 9/2006 | Schönebeck |

FOREIGN PATENT DOCUMENTS

| DE | 34 29 671 A1 | 1/1985 |
| DE | 38 20 845 A1 | 12/1989 |
| DE | 199 58 605 A1 | 6/2001 |
| DE | 101 59 301 A1 | 6/2003 |
| DE | 101 64 508 A1 | 7/2003 |
| DE | 102 16 766 A1 | 11/2003 |
| WO | 2004/043770 A1 | 5/2004 |

OTHER PUBLICATIONS

Dem Dachmodul Gehört Die Zukunft.
Dachmodul—Die Chancen Und Risiken, Zulieferer Trends, Automobil-Production, Oct. 2001, p. 114-115.
Dr.-Ing. A. Weißbrich, et al., Modular Systems for a Customer Orientated Individualisation, VDI Berichte, NR. 1264, 1996, pp. 513-534—English Summary.

* cited by examiner

*Primary Examiner* — Lori Lyjak
(74) *Attorney, Agent, or Firm* — Roberts Mlotkowski Safran & Cole, P.C.; David S. Safran

(57) ABSTRACT

A vehicle roof for a passenger car, the vehicle roof having a modular, multishell structure, the vehicle roof including a variably configurable functional shell for providing stiffness to the vehicle roof and configured to be directly attached to a body shell of the vehicle and for variable accommodation of functional elements; an outside roof skin configured to be fixed to an outside surface of the functional shell with a fixing means; and at least one inside lining element configured to be fixed to an inside surface of the functional shell.

10 Claims, 3 Drawing Sheets

VEHICLE ROOF HAVING A MODULAR, MULTISHELL STRUCTURE

BACKGROUND OF THE INVENTION

1. Field of Invention

The present invention generally relates to a vehicle roof, and more particularly to an improved roof for a passenger car.

2. Description of Related Art

Currently, roofs for passenger cars are often made in the form of a roof module, which is connected to the body when the vehicle is assembled. Different functional parts, such as a sliding roof, lighting or the like, can be integrated in the roof module.

A roof module of a vehicle roof, which includes an outer roof skin, and a head liner, which represents an inside lining part, and to which an antenna and other electrical means are attached is known from German Patent No. DE 199 58 605 A1. However, the head liner is not suited for attachment of heavy functional elements, such as, for example, a sliding roof or the like.

German Patent No. DE 199 51 659 C2, which corresponds to U.S. Pat. No. 6,318,797, discloses a vehicle roof, which is made as a sandwich-like composite component. This vehicle roof, which can be placed with its outside edges on the body frame, and which can be permanently connected to it, has an outer shell, which is used as the outer roof skin. The vehicle roof is backed with an inside shell, which is molded from foam plastic and is used as an inside roof lining. In the inside shell, there are recesses for functional elements, such as speakers or the like. The configuration of the vehicle roof with functional elements is established in the production of the inner shell, i.e., when the inside shell is foamed onto the outside roof skin, since the corresponding recesses, for aesthetic reasons, must be equipped with the corresponding functional elements.

Furthermore, U.S. Pat. No. 5,825,096 discloses a roof module, which is provided with a head liner element, and with a carrier element for carrying electrical means on an edge area thereof facing the windshield. The carrier element extends in the transverse direction of the vehicle and is fitted into a recess of the head liner element.

SUMMARY OF THE INVENTION

Accordingly, an object of the invention is to devise a vehicle roof which allows simple and variable installation of a choice of functional elements, and which is to be determined at the time of installation.

The above and other objects are achieved by providing a vehicle roof for a passenger car, the vehicle roof having a modular, multishell structure, the vehicle roof including a variably configurable functional shell for providing stiffness to the vehicle roof and configured to be directly attached to a body shell of the vehicle and for variable accommodation of functional elements; an outside roof skin configured to be fixed to an outside surface of the functional shell with a fixing means; and at least one inside lining element configured to be fixed to an inside surface of the functional shell.

Therefore, the invention lies in designing a vehicle roof, which is made especially as a roof module, especially the roof of a passenger car, with a module-like, multishell structure, which has a variably configurable functional shell attached to the body shell, which dictates essentially the stiffness of the vehicle roof, and which is used for variable accommodation of functional elements. The functional shell is overlapped on the outside of the vehicle by the outside roof skin and on the inside of the vehicle by at least one inside lining element.

A standardized platform for a vehicle roof for a certain vehicle type, which can be provided with different functional elements depending on the requirement or customer wishes, can be formed by a functional shell of the invention.

Functional elements, in the sense of the invention, include electrical or mechanical components, which can be integrated optionally or also necessarily in a vehicle roof, for example, including lighting means or components of a roof opening system.

Because the functional shell is tied directly to the body shell of the vehicle, interfaces between the vehicle roof and the body shell can be formed in an optimized manner. This relates especially to the manner of attachment of the vehicle roof to the body shell, and in the case of integration of a roof opening system, the execution of a water drainage system, which can be integrated into the functional shell, and which can be connected to channels, which are made in the body shell.

In this connection, the body shell is defined as the part of the vehicle body, which constitutes the frame of the vehicle to be lined, and essentially dictates the fundamental structure, and the stiffness of the vehicle, but which is not yet provided with a roof. Thus, the body shell in a vehicle made as a limousine generally includes the A, B and C pillars, and side frame to which the vehicle roof of the invention preferably can be fixed.

The concept of "variably configurable" means that the functional shell is provided with means such that different functional elements can be easily integrated or mounted, depending on the stipulations of the vehicle manufacturer and/or a customer, on the same platform, i.e., on the functional shell. Thus, the vehicle roof can be flexibly designed and variously configured using the same platform. The completely configured functional shell is provided with the outside roof skin before or after it is equipped with the functional elements. The finished vehicle roof can then be easily mounted on the vehicle body shell. In particular, logistics and installation on the side of the vehicle manufacturer can be optimized by using the flexibly configurable vehicle roof of the invention.

The functional shell, which can also assume vehicle-structural tasks, can furthermore include at least one cross member, especially at least one cowl of the vehicle roof. This layout of the functional shell makes it easier for the vehicle manufacturer to integrate the cross members of the vehicle roof, and which can be assigned to the body shell. They then can be easily made available with the vehicle body shell together with the vehicle roof.

One embodiment of the vehicle roof, which is especially lightweight, is present when the functional shell is made as a plastic molding. In this functional shell, the structural elements, which dictate the stiffness of the vehicle roof, such as the dome, ribs and the like, can be easily integrated, providing great flexibility with respect to their arrangement, and with favorable and optimized locations on the functional shell.

The production of a plastic functional shell proceeds, for example, according to an injection molding process or other shaping process, according to which a functional shell, which is relatively torsionally stiff, according to existing safety regulations, can be produced. Optionally, in the plastic molding step, reinforcements or other elements, which increase the stability, can be integrated. Alternatively, it is of course also conceivable to produce a functional shell of the invention, which constitutes an assembly carrier, from steel, aluminum or the like. A functional shell made as a plastic molding can, however, lead to a low package mass of the vehicle roof, than a function shell made of metal.

In order to be able to provide a roof opening system in the vehicle roof of the invention, the functional shell is preferably provided at the plant with a cutout-like recess having an area which corresponds to the area of the roof opening. A roof opening system, which can thus be optionally integrated, can include, for example, an electrical sliding and lifting roof, a raising roof or also a wrap-around roof. The layout of the recess can be standardized for different roof opening systems. If in the configuration of the vehicle roof of this embodiment, a roof opening system is not needed, the outside roof skin and the body-mounted inside lining element are made such that they overlap the recess.

The functional shell is preferably also provided with means for integration of the roof opening system, and which are used especially for fixing of mechanical and electrical components of the roof opening system, such as an electric drive, drive cables, or drive tubes, or can also constitute these components themselves, such as guide rails or the like.

Preferably the functional shell is provided with a water drainage system, which is necessary when a roof opening system is integrated. The water drainage system can also be formed in a plastic functional shell, directly during its production, in the form of channels, which are formed in one piece with the functional shell, and which are preferably made such that when the functional shell is tied to the vehicle body shell, the water drainage system interacts with the water drainage channels integrated into the vehicle body shell.

Furthermore, the functional shell can also be provided with air guide ducts, such as air conditioning ducts, which can be assigned to a ventilation system or also an air conditioning system of the pertinent vehicle. If necessary, they can also be integrated in one piece, especially when the functional shell is made as a plastic molding directly in its manufacture.

The functional shell is also preferably provided with means for integration of electrical components. These means can include, for example, recesses for lights, switches, speakers or the like, and fastening means for these functional elements. On the functional shell there can also be a means, which is made, for example, as a recess and/or attachment means, for integration of an antenna system or a multimedia system.

Furthermore, wiring can also be imprinted on the functional shell. This enables the wiring to be made suitably long, according to any requirements, and thus saves weight, as compared to conventional systems in which the wiring is made separate and for installation reasons an additional wire length is necessary.

Furthermore, on the functional shell there can be provided means for at least partial integration of an airbag system. There can also be provided means for integration of gas generators for the airbag system, especially for a head airbag system.

The functional shell can include at least one head impact pad, which is designed according to safety stipulations, such as so-called head impact criteria.

In order to be able to easily attach the inside lining element, which is generally attached to the side frame of the body shell and which constitutes especially a head liner, preferably attachment means for the inside lining element are provided on the functional shell. The inside lining element can be tied to the functional shell when the vehicle roof, which is made as a roof module, is installed or can be arranged only in a subsequent working step under the functional shell.

For exact positioning of the inside lining element, the functional shell can be provided with at least one positioning aid for installing the inside lining element. The positioning aid includes, for example, a so-called master hole, and optionally a dome.

The outside roof skin of the vehicle roof of the invention generally does not constitute a structural component, which dictates the stiffness of the roof, but only a component which dictates the external appearance of the vehicle roof, and which is fixed on the functional shell. Fixing is implemented, for example, by means of a cement system, a catch system or also by means of a clip system. The generally flexible outside roof skin, which can be made from steel, aluminum or also plastic, is made interchangeable in an embodiment of the vehicle roof of the invention, so that the owner of the pertinent vehicle can easily change the appearance of the roof, without major cost, by attaching another suitable outside roof skin.

In order to achieve high stiffness in the connecting region between the functional shell and the body shell, the functional shell is preferably screwed to the body shell and for this purpose is provided with the corresponding recesses for passage of fastening screws.

For further stabilization and for sealing, the functional shell can be provided with a cement system for tying to the functional shell to the body shell. The cement can be, for example, single-component or dual-component cement, which forms a cement bead, and in the hardened state has a certain residual elasticity.

Other advantages and advantageous embodiments of the invention can be taken from the specification, the drawings, and the claims.

One embodiment of the vehicle roof of the invention is shown schematically simplified in the following drawings and is detailed in the following description.

DETAILED DESCRIPTION OF THE INVENTION

Figure 1:
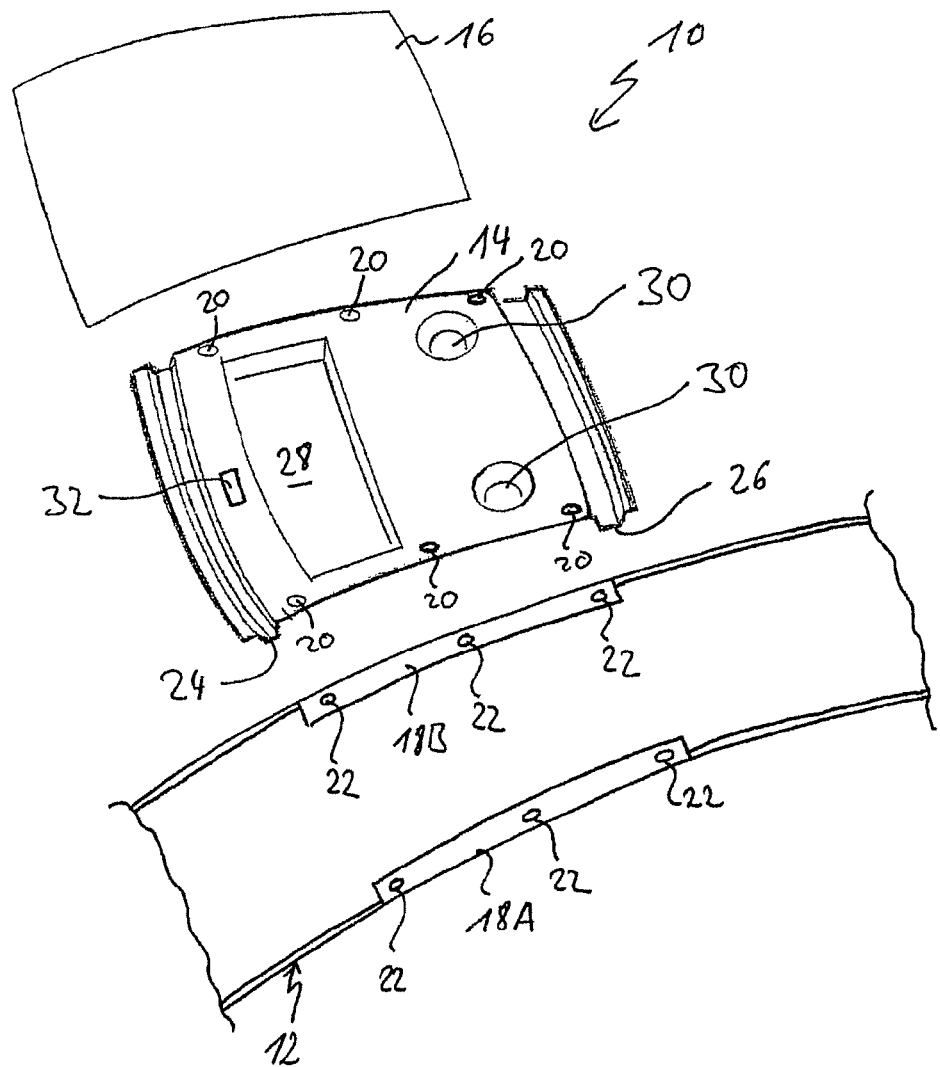
FIG. 1 shows a perspective top view of a vehicle roof, according to an embodiment of the present invention, together with the region of a vehicle body shell in an exploded view.
Figure 2:
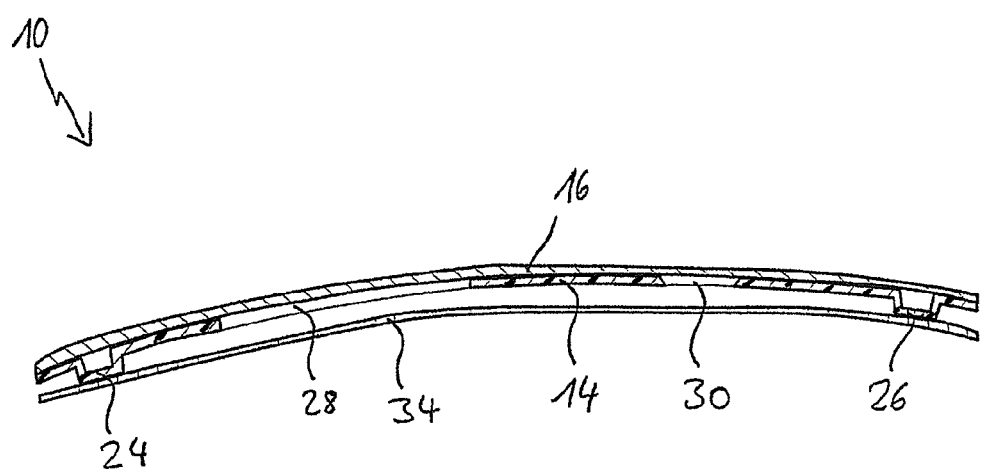
FIG. 2 shows a schematic lengthwise section through the vehicle roof of FIG. 1 of the embodiment of the present invention.

FIGS. 1-2 show a roof module 10, which forms a vehicle roof, and which can be flexibly preconfigured for tying to the body shell 12 of a motor vehicle. The roof module 10 has a module-like, multishell structure and includes a functional shell 14 made from plastic injection molding, and which dictates essentially the stiffness of the roof module 10, and the likewise plastic outside skin 16, which dictates the external appearance of the roof module 10. The outside roof skin 16 is cemented onto the top of the functional shell 14 by means of a cement system, which forms an attachment means.

The functional shell 14 in the mounted state of the roof module 10 is screwed via the body shell side frame regions 18A, and 18B directly to the body shell 12 of the vehicle and for this purpose has recesses 20 for engaging respective fastening screws. The recesses 20 are optionally provided with an inside thread and correspond to holes 22 on the body shell side frame regions 18A, and 18B.

To ensure tight connection, the functional shell is furthermore tied to the body shell frame regions 18A, and 18B by means of a cement bead (not shown). In its front edge region, the functional shell 14 has a section 24, which extends in the transverse direction of the vehicle, and which forms a front cowl, and therefore a front, safety-relevant transverse member of the vehicle roof 10. In its rear edge region, the functional shell 14 has a section 26, which extends in the transverse direction of the vehicle, and which forms a rear cowl, and therefore a rear, safety-relevant transverse member of the vehicle roof 10. The sections 24 and 26 therefore form structures, which are of major importance for the stiffness and stability of the pertinent vehicle in its roof region. Preferably, the functional shell is provided with a water drainage system, which is necessary when a roof opening system is integrated. The water drainage system can be formed in a plastic functional shell, directly during its production, in the form of channels, which are formed in one piece with the functional shell, and which are preferably made such that when the functional shell is tied to the vehicle body shell, the water drainage system interacts with the water drainage channels integrated into the vehicle body shell. Due to the channel shape of the cowl sections 24, 26, they can serve this function as well.

Figure 3:
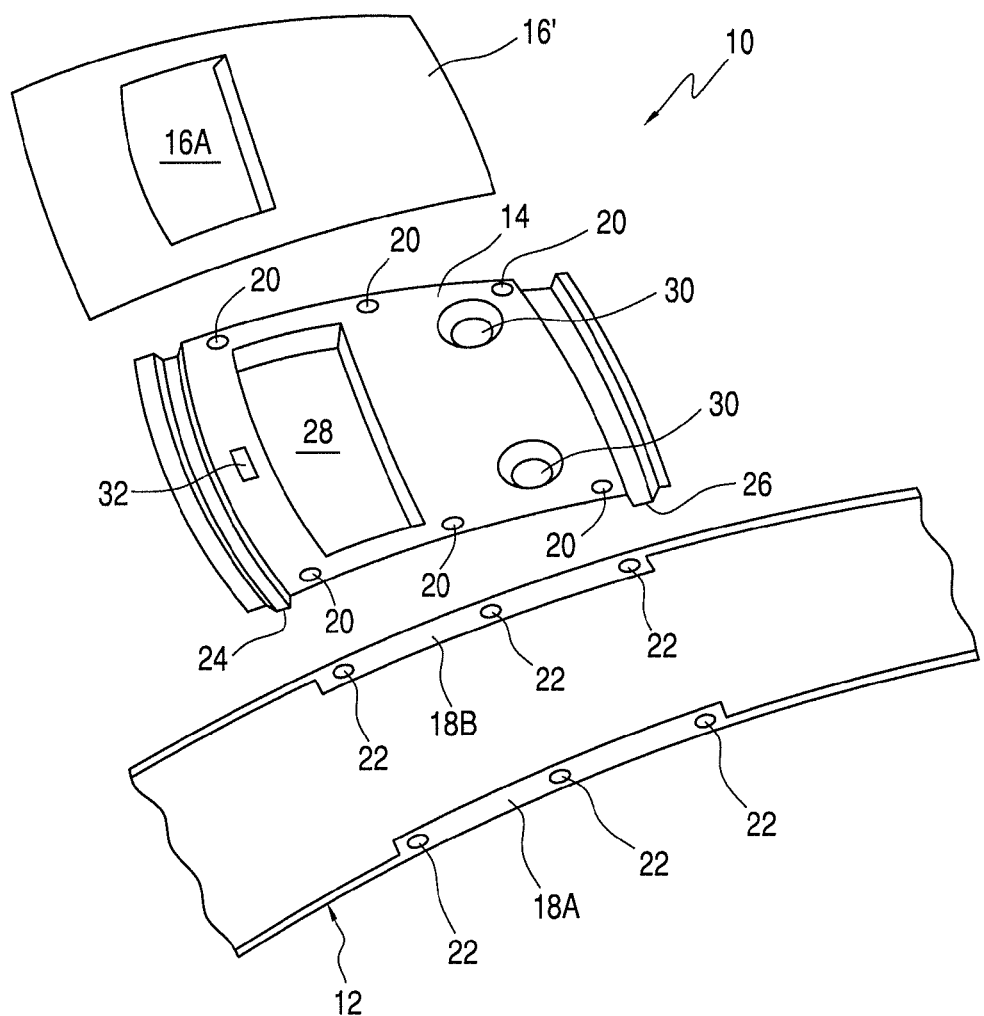
FIG. 3 shows a perspective top view of a vehicle roof similar to that of FIG. 1 but with an outside roof skin having an opening matched to a cutout of the functional shell.

Furthermore, on the functional shell 14 there is a cutout 28 for a roof opening system (not shown), which constitutes a functional element, and receivers 30 for speakers of an audio/video system (not shown) of the pertinent vehicle, and which constitute another functional element. A fixing means 32 for an electric drive of a roof opening system (not shown), which likewise constitutes a functional element, and with which the vehicle roof 10 could be equipped in another configuration is also formed on the functional shell 14. When the vehicle roof 10 is equipped with a roof opening system, instead of the closed outside roof skin 16 shown in the figures, an outside roof skin would be used that is also provided with a cutout 16A, which corresponds to the cutout 28 of the functional shell 14 as shown in FIG. 3, and which could be selectively opened and closed by means of a movable cover element (not shown).

Furthermore, the functional shell 14 includes printed wiring (not shown) and which likewise constitutes functional elements for inside lighting means of the vehicle. On its inside, the functional shell 14 is overlapped by a head liner 34, which constitutes the inside lining element, and which in the region of the receivers 30 is made perforated for the speakers for optimized sound transmission. The head liner 34 is connected to the functional shell 14 after installation of the functional shell 14 on the body shell frame regions 18A, and 18B.

What is claimed is:

1. A vehicle roof for a passenger car, the vehicle roof having a modular, multishell structure, comprising:
 a variably configurable functional shell for providing stiffness to the vehicle roof and configured to be directly attached to a body shell of the vehicle and for variable accommodation of functional elements;
 an outside roof skin configured to be fixed to an outside surface of the functional shell; and
 at least one inside lining element configured to be fixed to an inside surface of the functional shell;
 wherein the functional shell has a cutout for a roof opening system and means for fixing mechanical and electrical components of the roof opening system, and
 wherein the outside roof skin covers the cutout of the functional shell and is interchangeable with an outside roof skin having an opening matched to the cutout of the functional shell.

2. The vehicle roof of claim 1, wherein the functional shell comprises at least one cross member, including at least one cowl of the vehicle roof.

3. The vehicle roof of claim 1, wherein the functional shell comprises a plastic molding.

4. The vehicle roof of claim 1, wherein the functional shell includes a recess with an area corresponding essentially to an area of an opening of the vehicle roof.

5. The vehicle roof of claim 1, wherein the functional shell includes a water drainage system.

6. The vehicle roof of claim 1, wherein the functional shell includes means for integration of electrical components.

7. The vehicle roof of claim 1, wherein the functional shell includes recesses for attachment of the functional shell to the body shell of the vehicle.

8. A vehicle roof for a passenger car, the vehicle roof having a modular, multi-shell structure, comprising:
 a variably configurable functional shell for providing stiffness to the vehicle roof and configured to be directly attached to a body shell of the vehicle and for variable accommodation of functional elements;
 an outside roof skin configured to be fixed to an outside surface of the functional shell; and
 at least one inside lining element configured to be fixed to an inside surface of the functional shell
  wherein a front edge region of the functional shell a section which extends across the functional shell in a transverse direction of the vehicle and which forms a front cowl in a manner creating a front safety-relevant transverse member that provides stiffness and stability to the front area of the vehicle roof; and
  wherein a rear edge region of the functional shell has a section which extends across the functional shell in the transverse direction of the vehicle and which forms a rear cowl in a manner creating a rear safety-relevant transverse member that provides stiffness and stability to the rear area of the vehicle roof.

9. The vehicle roof of claim 8, wherein the front and rear cowls are channel shaped.

10. The vehicle roof of claim 9, wherein the at least one inside lining element comprises a headliner that is directly attached to an underside area of the front and rear cowls.

* * * * *